United States Patent [19]

Canal et al.

[11] Patent Number: 5,310,996
[45] Date of Patent: May 10, 1994

[54] METHOD AND APPARATUS FOR DETERMINING RECORDING TIME AVAILABLE ON A VIDEOTAPE CASSETTE

[75] Inventors: John A. Canal, 205 NE. 3rd St., Satellite Beach, Fla. 32937; Warren L. Franz, Orlando, Fla.

[73] Assignee: John A. Canal, Satellite Beach, Fla.

[21] Appl. No.: 29,772

[22] Filed: Mar. 11, 1993

Related U.S. Application Data

[63] Continuation-in-part of Ser. No. 890,644, May 28, 1992, abandoned.

[51] Int. Cl.$^5$ .................... G06C 27/00; G06C 3/00
[52] U.S. Cl. ..................... 235/78 R; 235/83; 235/88 R; 33/15 D
[58] Field of Search ............... 235/77, 78 R, 78 A, 235/78 F, 78 G, 78 M, 78 N, 78 RC, 83, 88 R, 88 F, 88 G, 88 M, 88 N, 88 RC; 242/199; 33/15 B, 15 D, 1 C, 783, 792, 794, 798, 801, 679.1

[56] References Cited

U.S. PATENT DOCUMENTS

| | | | |
|---|---|---|---|
| 1,065,744 | 6/1913 | Sutorik | 33/792 |
| 1,361,697 | 12/1920 | Dugit | 235/83 |
| 2,435,606 | 2/1948 | Sadowsky | 33/15 D |
| 2,838,239 | 6/1958 | Dom | 235/114 |
| 2,973,143 | 2/1961 | Thompson | 235/78 R |
| 3,013,720 | 12/1961 | Steinkoenig | 235/78 R |
| 3,127,811 | 4/1964 | Filangeri | 33/15 D |
| 3,630,170 | 12/1971 | Christo | 116/114 |
| 3,802,106 | 4/1974 | Lippman | 40/309 |
| 4,060,900 | 12/1977 | Greenwood | 235/88 M |
| 4,501,396 | 2/1985 | Tomsyck et al. | 242/199 |
| 4,835,371 | 5/1989 | Rogers | 235/78 R |
| 4,893,414 | 1/1990 | Samonek | 33/501 |
| 4,947,558 | 8/1990 | Cummins | 33/801 |

FOREIGN PATENT DOCUMENTS 722866 12/1965 Canada .

Primary Examiner—Michael L. Gellner
Assistant Examiner—Eddie C. Lee
Attorney, Agent, or Firm—Warren L. Franz

[57] ABSTRACT

The amount of recording time remaining on a partially recorded videotape cassette (11) is measured by fixing the position of a body member (17, 117) relative to the hub (14) of a cassette reel, and moving a pointer (24, 120) to point to the outermost layer (33) of tape (12) wrapped around the hub (14). Movement of the pointer relative to the body member causes corresponding movement of an index (38, 145) relative to a time scale (39, 125), so that the remaining time can be read off the scale. The pointer is coupled so that small movement of the pointer relative to the body member, causes large movement of the index relative to the scale. In one embodiment, a transparent disc pointer (17) is coaxially attached to a transparent disc body member (24). Disc (24) is rotated to position the point of intersection of a spiral line (34) on disc (24) with a radial line (23) on disc (17) above the outermost layer (33) of the tape, causing corresponding rotation of a radial line (41) on disc (24) relative to a time scale (39) annularly located on disc (17).

20 Claims, 2 Drawing Sheets

METHOD AND APPARATUS FOR DETERMINING RECORDING TIME AVAILABLE ON A VIDEOTAPE CASSETTE

This is a continuation-in-part of Ser. No. 07/890,644, filed May 28, 1992, the full disclosure of which is incorporated herein by reference, now abandoned.

BACKGROUND OF THE INVENTION

This invention relates to a method and apparatus for determining the recording time available on a videotape cassette; and, in particular, to an apparatus for determining the remaining recording time on a partially recorded videotape cassette.

Conventional videotape cassettes, such as VHS format cassettes available commercially for time-displacement recording of television programs in the home, comprise rectangular casings within which are protectively housed fixed lengths of magnetic video recording tape mounted for transportation between supply and take-up reels, across a video cassette recorder (VCR) read-write recording head. Such tapes come in T30, T60, T120, T130 and T160 different tape sizes, respectively corresponding to different 30, 60, 120, 130 and 160 minutes of nominally available recording time. The actual recording time available on a particular tape is a multiple of the nominal recording time determined by the recording speed (SP, LP or EP).

There is a problem when you want to record several long programs, such as full-length movies, on a single tape. If the tape is already partially recorded, there may not be enough recording time left to get the whole program. So, either the end will be missed, or the tape will rewind automatically and begin recording over the first program, depending on the type of VCR you use. One way to guard against this is to use a new tape each time you record; but, this wastes tape. Another way is to set the counter on the VCR and keep track of used and unused tape that way. That is cumbersome and it is easy to forget to reset the tape counter. A more convenient way is to be able to determine how much recording time is left, just by measuring the amount of unrecorded tape left on the supply reel, or amount of recorded tape taken up on the take-up reel.

Existing ways for measuring the amount of tape on the supply or take-up reel are unsatisfactory. The cassette housing itself has see-through viewing ports windows above the reels with markings at radially-spaced increments, but these are hard to see and do not include time identifications. Moreover, because the reels are merely captured and not fixed against translational movement within the cassette housing, considerable float exists between the reel hubs and the markings, making such readings inaccurate. Stickers, such as shown in U.S. Pat. No. 4,501,396, can be applied to the windows to improve readability; however, they do not accommodate the float. Rulers, such as shown in U.S. Pat. No. 4,893,414, exist that can be placed over a window and lined up with the hub. Such rulers have markings identified by increments of unrecorded/recorded time associated with corresponding different radii of tape loaded on the hub. The linear scales on such direct reading devices are, however, too crowded to be useful in a close case.

SUMMARY OF THE INVENTION

It is an object of the present invention to provide a method and apparatus for determining, simply and inexpensively, in a visually, readily discernable manner, the remaining recording time available on a partially recorded videotape cassette, based on the amount of unrecorded tape left on the cassette tape supply reel, or amount of recorded tape taken up on the cassette tape take-up reel.

In accordance with the invention, apparatus for determining the available recording time comprises a body member, a pointer movably mounted on the body member, means for establishing a known reference location of the body member relative to the hub of a reel of the videotape cassette, and means for indicating the amount of available recording time in response to positioning of the pointer to mark the location of the outside layer of tape then wrapped around the hub on the reel.

BRIEF DESCRIPTION OF THE DRAWINGS

The invention is illustrated with reference to the accompanying drawings, wherein.

Throughout the drawings, like elements are referred to by like numerals.

DETAILED DESCRIPTION OF PREFERRED EMBODIMENTS

Figure 1:
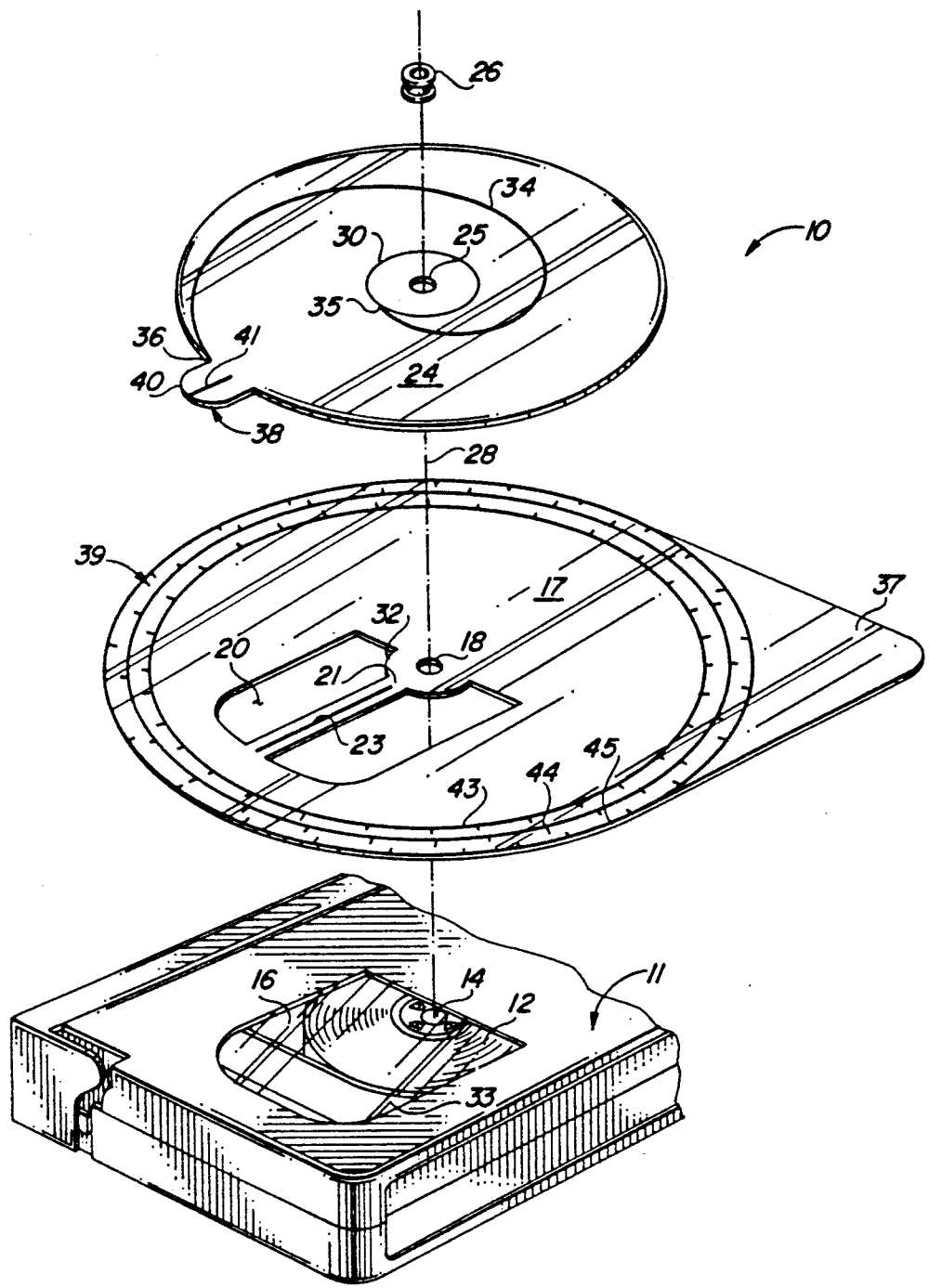
FIG. 1 is an exploded view of an embodiment of the apparatus, in accordance with the principles of the invention, for determining the available recording time on a videotape cassette.

FIG. 1 shows apparatus 10, in accordance with the invention, being placed on a T120 or T130 videotape cassette 11 in a position suitable for determining the amount of time available for recording on a magnetic video recording tape 12 mounted on a supply reel having a floating hub 14 captured for rotation within the protective confines of a cassette housing 15. The housing 15, in conventional manner, includes a see-through window 16 through which the amount of tape wrapped around reel 14 can be viewed.

The apparatus 10 comprises a body member in the form of a first transparent circular disc 17 having an axial central bore 18 and a divided cutout area 20 bisected by a radially-directed linear strip 21 on which is marked a radial reference line 23. A pointer in the form of a second transparent circular disc 24 includes an axial central bore 25, and is joined in coaxial parallel superposed relationship to first disc 17 by a rivet 26 passing through aligned bores 18, 25. Such connection fixes the relative radial positions of discs 17, 24, while enabling relative rotational movement about an axis 28.

Figure 2:
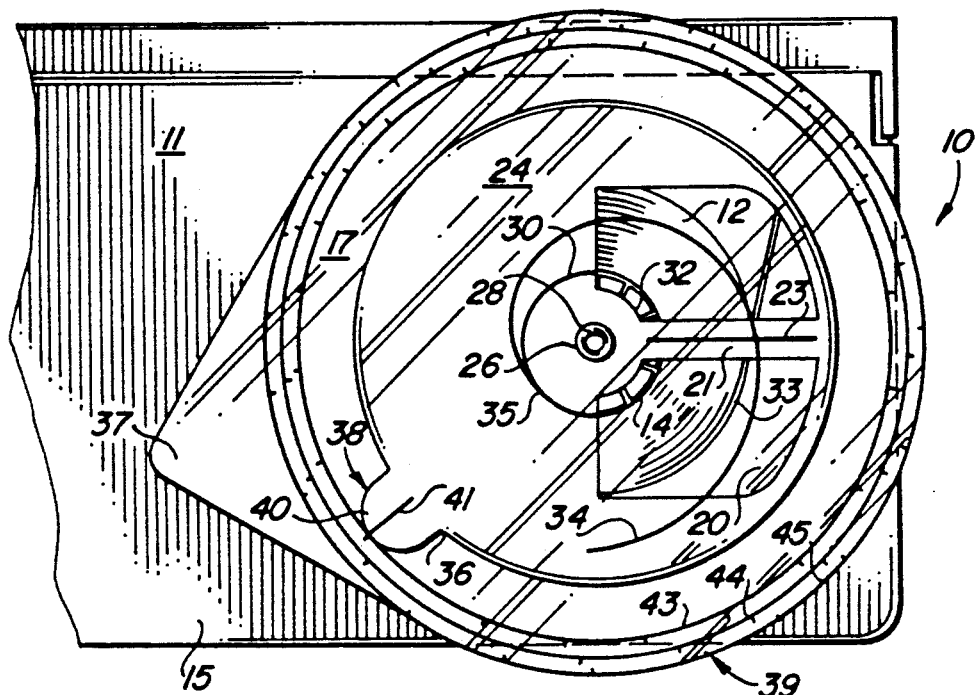
FIG. 2 is a top plan view of the apparatus of FIG. 1.

In accordance with the principles of the invention, apparatus 10 has an alignment guide for establishing a known fixed positional relationship between body member 17 and the hub 14. For the embodiment illustrated in FIGS. 1 and 2, the guide is furnished in the form of a circular visual reference line 30 having a diameter matching the outside diameter of hub 14 visible through window 16. Line 30 is shown located on disc 24 with its center coincident with the center of disc 24. Aligning circle 30 with hub 14 will set a positional relationship of body member 17 relative to hub 14, independent of variations of the position of hub 14 within the cassette 11 relative to window 16. Cutout 20 makes it possible to view hub 14 through only one, rather than two, thicknesses of transparent disc material. The inner contour of cutout 20 preferably includes a circular portion 32 viewable within the interior of circle 30 and, preferably, matching the diameter of one of the inside circular flanges typically found on the usual hub 14. In this manner, as shown in FIG. 2, alignment of apparatus 10 with hub 14 can be achieved by aligning the part of hub 14 viewable through cutout 20, annularly between the contour 32 of disc 17 and the circle 30 of disc 24.

For setting the position of pointer 24 relative to body member 17, to correspond with the radial position of the outside layer 33 of tape 12 relative to hub 14, a spiral line 34 is provided on the face of disc 24. Spiral 34 expands radially, circumferentially of disc 24 from an inner point 35 coincident with circle 30 to an outer point 36 coincident with the circular perimeter of disc 24. The illustrated spiral 34 is configured so that rotating disc 24 about axis 28, with axis 28 held coincident with the center of hub 14, will cause the intersection (when viewed from above, as seen in FIG. 2) of spiral 34 and radial reference line 23 to move continuously radially outward from intersection at point 35 to intersection at point 36. In this arrangement, each point of intersection in the radial progression from point 35 to point 36 will correspond to a different progressive angular orientation for one revolution of disc 24. An index 38 established on one of discs 17, 24 will, thus, be correspondingly moved progressively along a time scale 39 established on the other of discs 17, 24.

A suitable arrangement provides a radially directed arrow-shaped projection 40 peripherally of disc 24 to constitute the index 38. Projection 40 includes a radial reference line 41 in radial alignment with spiral inner point 35. Disc 24 is made with an outside diameter less than the outside diameter of disc 17 to provide scale 39 circumferentially marginally about disc 17 in an annular region of non-overlap of discs 17, 24. Scale 39 suitably includes three concentric time lines 43, 44, 45, each associated with a different video recording speed. Each time line 43, 44, 45 includes markings corresponding to respective increments of time (either time recorded or unrecorded) associated with different radial positions of the outer layer 33 of tape 12. To prevent the device 10 from sliding on the surface of cassette 11 while measurements are being made, a triangular enlargement 37 is provided in the plane of disc 17 to act as a platform for holding apparatus 10 by the thumb.

The radius of the unused tape on the hub 14 of supply reel (or of used tape on the take-up reel) changes in a definite, repeatable way as the length of tape 12 is unwound from the reel at a particular given recording speed. Each different radius represents a corresponding different amount of recording time left (or recording time used). This known relationship is mapped into the time lines 43, 44, 45 of scale 39, taking into account the change in angular positioning of the pointer disc 24 that occurs for the corresponding change in the intersection of spiral 34 and reference line 23 to match the position of the outside tape layer 33. Different tape recording speeds are accommodated by providing different sets of numerical character indicia on time lines 43, 44, 45. The described spiral arrangement functions to couple position of the outside layer 33 along reference line 23 with position of index 38 along time scale 39, so that a small change in the radial direction along line 23 produces a large change in the circumferential direction along scale 39. Such coupling enables the size of the scale 39 carrying the time lines 43, 44, 45 to be large enough to dimension and space the time increments in a visually, readily discernable way. This offers a great advantage over conventional, directly read rulers, which omit some readings and crowd other readings too closely together. It will be appreciated that the period of spiral 34 can be varied to change the relationship between the radial travel of the intersection of spiral 34 with line 23 and the angular travel of disc 24. For instance, spiral 34 could be configured to have two turns around circle 30, rather than one, so that disc 24 will rotate twice, rather than once, in moving the point of intersection from inner point 35 to outer point 36. Index 38 will, thus, travel twice around scale 39, providing even more spacing for listing time increments. Differentiation between readings for the first and second revolutions could, for example, be made using different colors.

In operation, the apparatus 10 is set down on top of a cassette 11 so that the circle alignment guide 18 lines up over the tape reel hub 14 visible through window 16. The thumb is placed down over enlargement 37 to maintain alignment during measurement. Disc 24 is then rotated relative to disc 17 about axis 28, until the intersection of spiral 34 on disc 24 with radial reference line 23 on disc 17 matches the outside edge of the outermost layer 33 of tape 12 wrapped around hub 14 viewable through window 16. Rotation of disc 24, besides moving the point of intersection radially of line 23, will simultaneously cause index 38 to move circumferentially along scale 39 by a time differential corresponding to the recording time represented by the amount of radial displacement of the point of intersection along line 23. The content and spacing of time representative indicia along time lines 43, 44, 45 are selected so that the unused recording time represented by the amount of tape 12 left on hub 14 can be determined by reading the time indicated by the indicia of time lines 43, 44 or 45 in alignment with the reference line indicator 41 of the arrow-shaped projection 40. Which line 43, 44 or 45 is read depends on which recording speed is being used, each line to be marked in accordance with time increments corresponding to a respective different one of the recording speeds.

Those skilled in the art to which the invention relates will appreciate that, while the depicted implementation determines available recording time from the decreasing radius of unrecorded tape wrapped around the hub of the supply reel, the same principles can be applied to determine the same information from the expanding radius of the take-up reel. Likewise, the same can be used to determine the time already recorded, rather than the time available. Likewise, it should be understood that there are yet other substitutions and modifications, beyond those described above, that can also be made to the described embodiment without departing from the spirit and scope of the invention as described by the claims below. And, it is intended that those claims cover all such equivalent arrangements.

What is claimed is:

1. Apparatus for determining the amount of recording time available on a videotape cassette; said cassette comprising a casing having interior confines; first and second reels having floating hubs and being captured for rotation within said confines; and a length of video recording tape mounted for transportation between said reels and having respective portions wound about said hubs; and said apparatus comprising:

a first transparent disc;

a second transparent disc;

a fastener securing said first and second discs in parallel superposed relationship for rotation of said second disc about an axis relative to said first disc;

an alignment guide for visually establishing a known reference location of said first disc relative to one of said hubs, independent of variations of position of said one of said hubs within said confines;

an index located on a first one of said first and second discs;

a time scale located on a first other of said first and second discs;

a reference line provided on a second one of said first and second discs; and a spiral provided on a second other of said first and second discs, said spiral expanding radially, circumferentially about said axis;

said index, time scale, reference line and spiral being relatively dimensioned and configured so that rotating said second disc about said axis relative to said first disc with said known reference location established, until intersection of said spiral with said reference line matches an outside edge of an outermost layer of said portion of tape wound about said one of said hubs, will align said index with said time scale to indicate the amount of recording time available.

2. Apparatus for determining the amount of recording time available on a videotape cassette; said cassette comprising a casing having interior confines; first and second reels having floating hubs and being captured for rotation within said confines; and a length of video recording tape mounted for transportation between said reels and having respective portions wound about said hubs; and said apparatus comprising:

a body member;

a pointer;

a fastener securing said body member and pointer in superposed relationship for rotation of said pointer about an axis relative to said body member;

an alignment guide for visually establishing a known reference location of said body member relative to one of said hubs, independent of variations of position of said one of said hubs within said confines;

an index located on a first one of said body member and pointer;

an incremental scale located on a first other of said body member and pointer;

a reference indicator provided on a second one of said body member and pointer; and a spiral provided on a second other of said body member and pointer, said spiral expanding radially, circumferentially about said axis;

said index, incremental scale, reference indicator and spiral being relatively dimensioned and configured so that rotating said pointer about said axis relative to said body member with said known reference location established, until intersection of said spiral with said reference indicator matches an outside edge of an outermost layer of said portion of tape wound about said one of said hubs, will align said index with said incremental scale to indicate the amount of recording time available.

3. Apparatus as in claim 2, wherein said body member comprises a first planar element; said pointer comprises a second planar element; and said fastener secures said first and second planar elements in parallel relationship.

4. Apparatus as in claim 3, wherein said first planar element comprises a first disc; said second planar element comprises a second disc; and said fastener secures said first and second discs in coaxial relationship.

5. Apparatus as in claim 2, wherein said body member has a first axial central bore; said pointer has a second axial central bore; and said fastener comprises means passing through said first and second bores.

6. Apparatus as in claim 2, wherein said alignment guide comprises a circular visual reference having a center coincident with said axis.

7. Apparatus as in claim 2, wherein said index comprises a reference line extending radially of said axis; and said scale extends circumferentially of said axis.

8. Apparatus as in claim 7, wherein said scale comprises a plurality of markings corresponding to respective increments of available recording time associated with different radial positions of said outside edge of said wound portion of tape.

9. Apparatus as in claim 1, wherein said scale comprises a plurality of scales, each including a plurality of markings corresponding to respective increments of available recording time associated with said different radial positions at a different video recording speed.

10. Apparatus as in claim 2, wherein said spiral expands radially, circumferentially of said axis from an inner point to an outer point; and said index comprises a first line extending radially of said axis in radial alignment with said spiral inner point.

11. Apparatus as in claim 10, wherein said alignment guide comprises a circular visual reference having a center coincident with said axis; and said spiral inner point is coincident with said circular visual reference.

12. Apparatus as in claim 2, further comprising an enlargement provided on said body member or pointer to act as a platform for holding said apparatus on said cassette.

13. Apparatus for determining the amount of recording time available on a videotape cassette; said cassette comprising a casing having interior confines; first and second reels having floating hubs and being captured for rotation within said confines; and a length of video recording tape mounted for transportation between said reels and having respective portions wound about said hubs; and said apparatus comprising:

a first planar element;

a second planar element;

a fastener securing said first and second planar elements in parallel superposed relationship for rotation of said second element about an axis relative to said first element;

an alignment guide for visually establishing a known reference location of said first element relative to one of said hubs, independent of variations of position of said one of said hubs within said confines;

an index located on said second element;

an incremental scale located on said first element and extending circumferentially of said axis;

a reference line provided on one of said first and second elements and extending radially of said axis; and a spiral provided on the other of said first and second elements, said spiral extending radially, circumferentially about said axis;

said index, incremental scale, reference line and spiral being relatively dimensioned and configured so that rotating said second element about said axis relative to said first element with said known reference location established, until intersection of said spiral with said reference line matches an outside edge of an outermost layer of said portion of tape wound about said one of said hubs, will align said index with said incremental scale to indicate the amount of recording time available.

14. Apparatus as in claim 13, wherein said scale comprises a plurality of markings corresponding to respective increments of available recording time associated with different radial positions of said outside edge of said wound portion of tape.

15. Apparatus as in claim 14, wherein said spiral extends radially, circumferentially of said axis from an inner point to an outer point; and said index comprises a first line extending radially of said axis in radial alignment with said spiral inner point.

16. Apparatus as in claim 15, wherein said alignment guide comprises a circular visual reference having a center coincident with said axis; and said spiral inner point is coincident with said circular visual reference.

17. Apparatus as in claim 16, wherein said first and second elements are first and second discs; and said fastener secures said first and second discs in coaxial relationship.

18. Apparatus as in claim 17, wherein said scale is provided circumferentially marginally about said first or second disc corresponding to said one of said first and second elements; and said scale comprises a plurality of scales, each including a plurality of markings corresponding to respective increments of available recording time associated with said different radial positions at a different recording speed.

19. Apparatus as in claim 18, wherein said one of said first and second elements is said first disc and said other of said first and second elements is said second disc.

20. Apparatus as in claim 19, wherein said first or second disc includes a triangular enlargement provided in a plane of the disc to act as a platform for holding said apparatus by a thumb on said cassette.

* * * * *